Fig. 6.

Patented Nov. 7, 1922.

1,434,794

UNITED STATES PATENT OFFICE.

RICHARD RUDDELL, OF SOUTH MANCHESTER, CONNECTICUT, ASSIGNOR TO CHENEY BROTHERS, OF SOUTH MANCHESTER, CONNECTICUT, A CORPORATION OF CONNECTICUT.

ENGRAVING MACHINE.

Application filed March 5, 1921. Serial No. 449,653.

*To all whom it may concern:*

Be it known that I, RICHARD RUDDELL, a citizen of the United States, residing at South Manchester, county of Hartford, State of Connecticut, have invented a certain new and useful Improvement in Engraving Machines, of which the following is a full, clear, and exact description.

My invention relates to engraving machines, and has for its object to produce a machine which will greatly reduce the hand labor now necessary for the engraving of metallic surfaces, more particularly the surfaces of printing rolls, shells and the like. It further has for its object to greatly reduce the time required and the expense involved in the engraving of such surfaces. It further has for its object to produce a machine in which sets of rolls or shells can be simultaneously engraved with counter part designs, as desired, by the use of mechanical guides or patterns.

The particular feature involved in my invention is the application to an engraving machine of the principles now employed in the Jacquard looms for the weaving of cloth. Another important feature is the introduction of a shifting jacquard needle board into a jacquard head. Another feature is the means for shifting the surfaces to be engraved axially and longitudinally. Another important feature is the use of a series of engraving tools or needles and means for actuating a plurality of the elements of said series simultaneously so as to produce longitudinal repeats of the design upon the surface to be engraved.

In the particular embodiment here described, the engraving is primarily done by scratching or puncturing a thin film of varnish previously spread over and dried upon the metallic surface to be engraved and thereafter immersing the object in a bath of acid which will eat into the body of the metal sufficiently to leave the pattern thereon of sufficient depth to receive the color for printing purposes. The coating of the surface or a copper roll or shell with varnish and scratching or puncturing it by an engraving tool and then subjecting it to an acid bath has long been practised by engravers, and is being practised today so that the details thereof are all fully understood by those skilled in the art of engraving rolls and the like for the printing of fabrics, paper, etc. The scratching or puncturing of the varnish in the manner heretofore used, so as to produce the pattern, however, is a very slow and tedious process requiring much time and labor and great attention on the part of the operator. It is also very expensive. By my invention the work which has heretofore been done by hand is accomplished mechanically and is controlled by a pattern which can be stored away and brought out from time to time whenever it is desired to engrave a given pattern upon a roll.

On account of the ease with which a pattern can be engraved upon a roll or other surface by a machine, it becomes practicable to turn down the rolls after a pattern has been used for a certain period even though there seems to be a possibility that the pattern may be used again, whereas, at present, expensive copper rolls and shells are kept for long periods without disturbing the engraving thereon on account of the great cost of work involved in such engraving. Furthermore, the speed with which the engraving can be done enables manufacturers to get out a new pattern at a much earlier date, and if the pattern fails to be as popular as was expected, the loss resulting therefrom is a much less serious matter than when the engraving is done by the old process.

The following is a description of my invention reference being had to the accompanying drawings, in which—

Fig. 3 is a plan view of the lower part of the machine on the line 3—3 of Fig. 4;

Fig. 4 is a front elevation of the part of the machine below the jacquard head with certain other details omitted;

Fig. 4^A is a detail of an automatic traverse feed shown near the left of Fig. 4 and at the right lower portion of Fig. 6;

Fig. 4ᴮ is a detail of the mechanism shown at the right of Fig. 4 and at the left of Fig. 5;

Fig. 7ᴬ is a detail of the tailstock and bearings on the line 7ᴬ—7ᴬ, Fig. 7;

Fig. 7ᴮ is a detail of the traverse ratchet on the line 7ᴮ—7ᴮ, Fig. 7;

Fig. 7ᶜ is a detail of the shell revolving gearing looking in the direction of the arrows 7ᶜ—7ᶜ, Fig. 7;

Fig. 7ᴰ shows medial sections of Fig. 7;

Fig. 8ᴬ is a front elevation of the same;

Fig. 8ᴮ are details of guiding combs;

Referring more particularly to the drawings: The machine as shown in its general assembly is one designed to engrave a set of five shells or rolls for five color printings, the engraving upon each shell being different and all the shells being engraved at the same time. Each shell and the mechanism for engraving it is, however, a duplicate so that it is only necessary to describe what is done in connection with one shell, and that will be done in connection with the rear one of the five shells.

Figures 7, 7A, 7B, 7C, 7D:
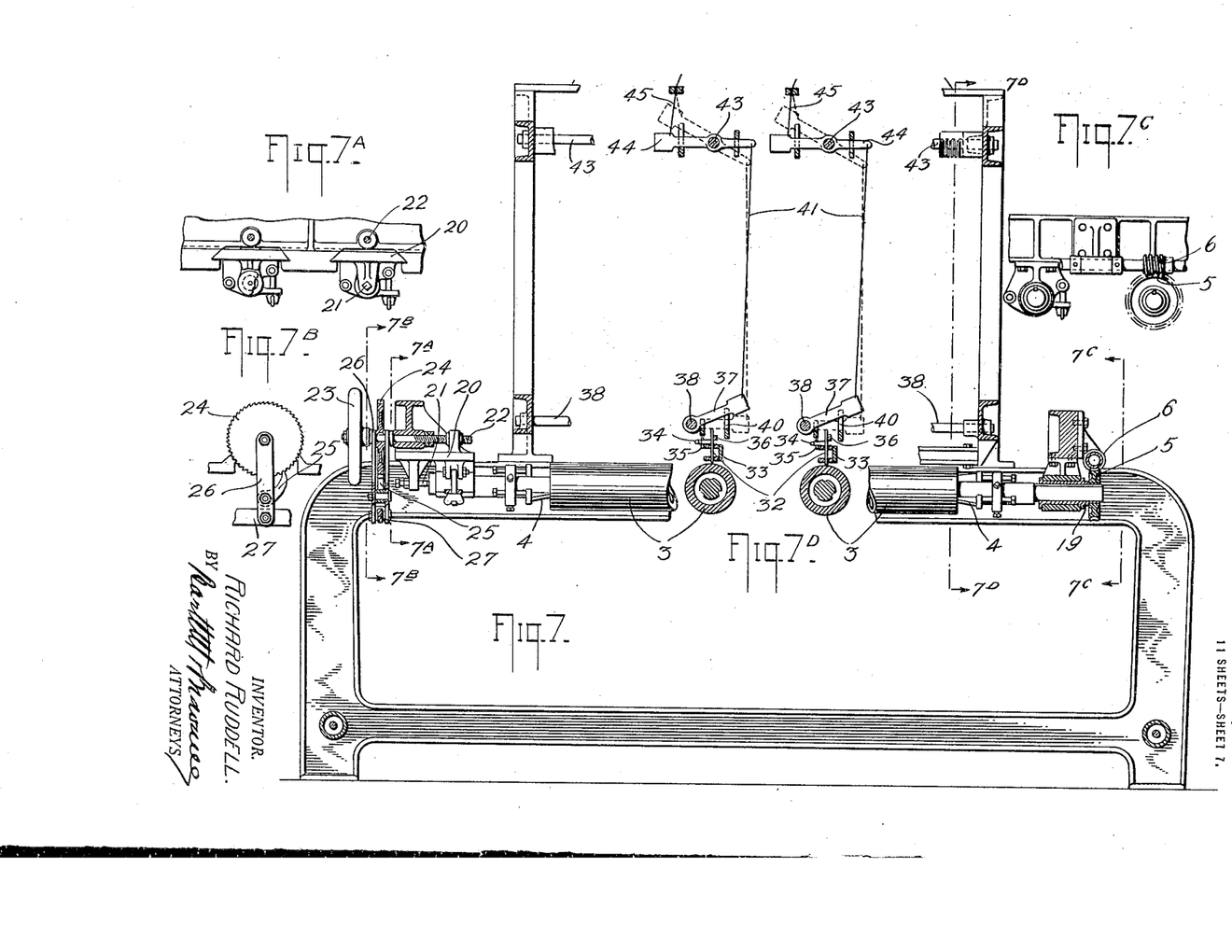
Fig. 7 is a section on the line 7—7 of Fig. 3.

1 is the frame work of the lower portion of the machine carrying five arbors 2, each of which is adapted to receive a copper shell 3, the shells being wedged thereon by wedges 4 as shown in Fig. 7, so that the axis of each shell coincides with the axis of its arbor. The arbors and shells are assembled on the bench being there adjusted concentrically and longitudinally and are put into the machine one at a time by a hand operated traveling crane from below and elevated into the bearings by a jack screw motion.

Figures 4, 4A, 4B:
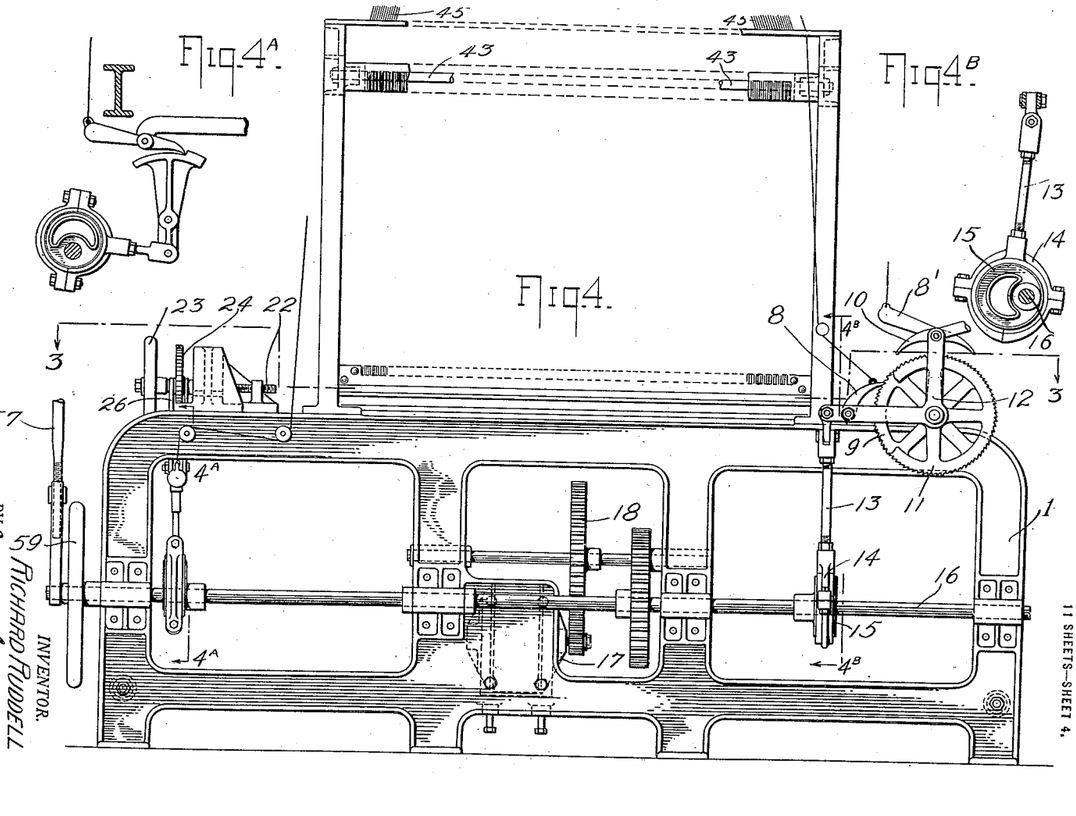
Figure 5:
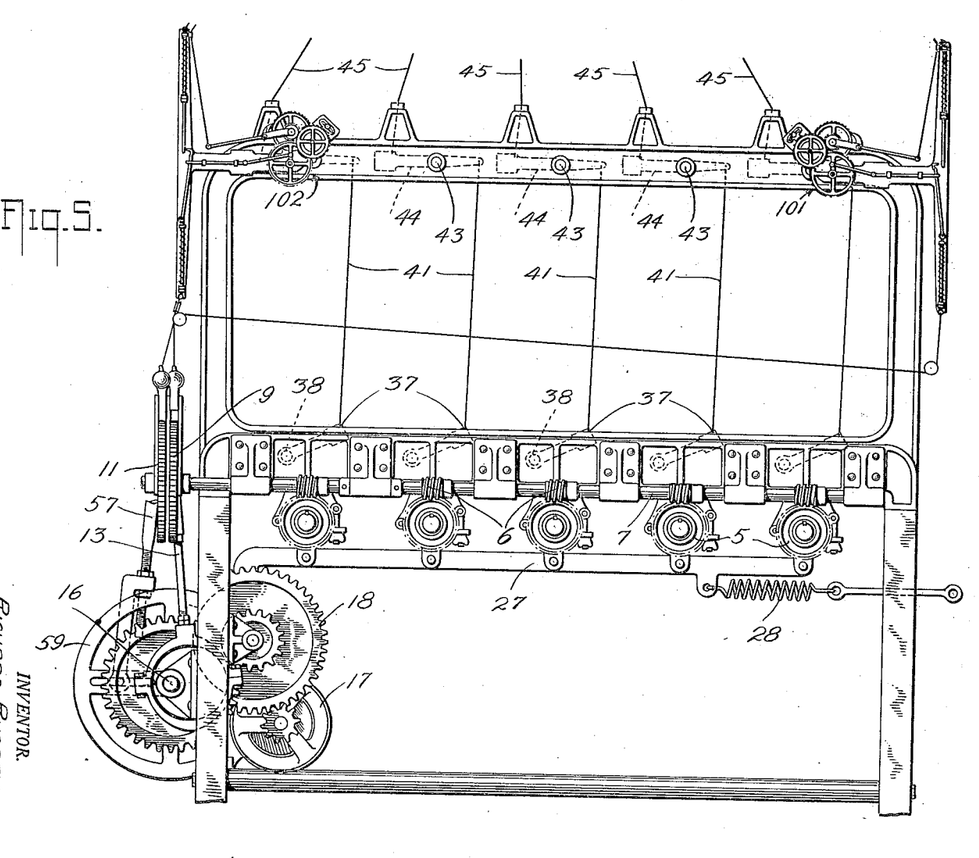
Fig. 5 is a right end elevation of the parts shown in Fig. 4.

All the arbors 2 are revolved simultaneously with an intermittent motion by worm gears 5 driven by worms 6 mounted on the shaft 7 which is driven with intermittent steps in one direction by a pawl 8, (Fig. 4) acting upon a ratchet wheel 9 being moved in the same direction at times a halfstep by the pawl 8′ and at other times in the other direction a halfstep by a pawl 10 acting upon the ratchet wheel 11, all of said three pawls being controlled by the jacquard head as hereinafter described. The pawl 8 revolves the shaft 7 through 360°. The pawls 8, 8′ and 10 are carried by a frame 12 connected by a universal joint to an eccentric link 13 connected to the ring 14 surrounding the eccentric 15 upon a shaft 16 driven by an electric motor 17 through the train of reduction gearing 18.

The mechanism just described has for its purpose to produce intermittent rotation of each of the shafts or arbors 2 carrying the shells 3. The pawl 8 produces a series of intermittent motions until the shell arbors have made a complete revolution whereupon the arbors are shifted longitudinally by means hereinafter described, and again revolved by the pawl 8, the action being repeated until three revolutions have taken place. After the first of said revolutions however, the pawl 8′ rotates the arbor a distance corresponding to one tooth, one half step, so that the starting or zero of the shell point is advanced a slight distance from the original zero point, resulting as will be hereinafter seen, in staggered joints in the engraving. The pawl 10 at the end of the second revolution moves the shell arbor backwards to the original starting or zero point.

The longitudinal movement of the arbor above referred to is permitted by surrounding the right hand end of the arbor with a bushing 19 to which the arbor is splined so that while it turns therewith, it is free to move longitudinally relatively thereto, the bushing being directly connected to the gear 5.

Figure 6:
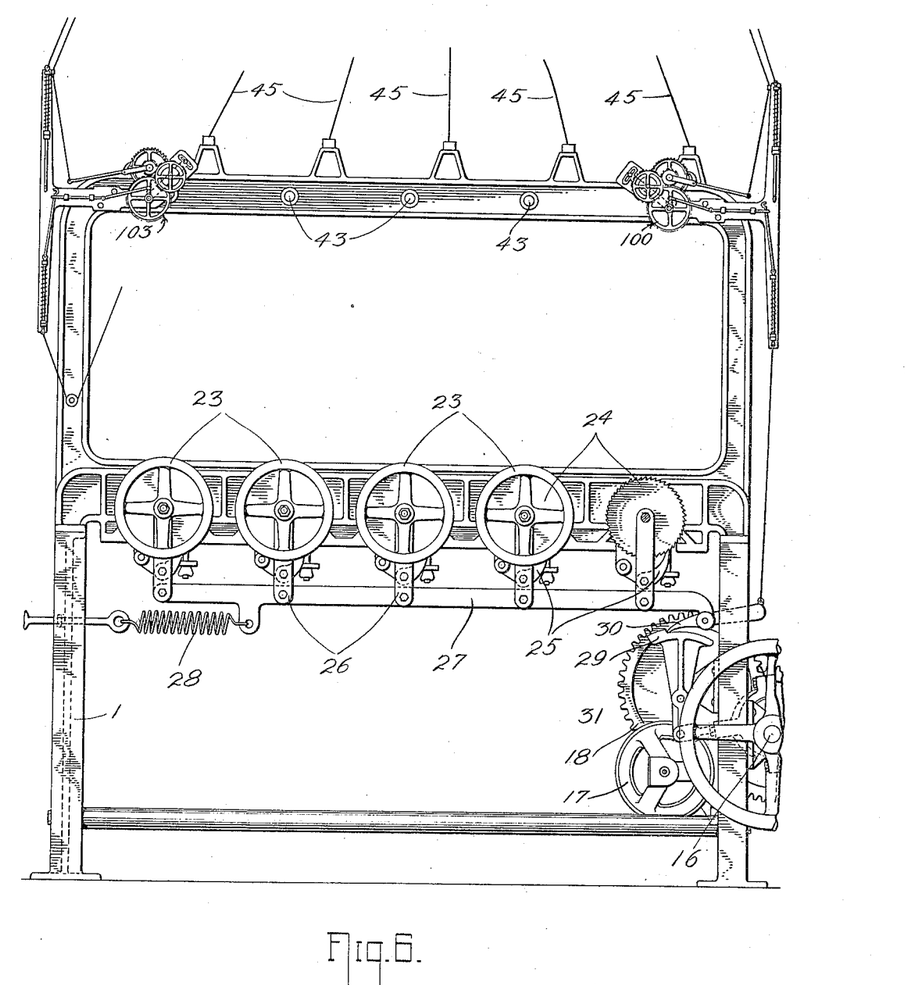
Fig. 6 is a left hand elevation of the same.

The longitudinal movement of the arbor is about as follows:

The left hand end of the arbor as shown in Fig. 7 is journaled in a tailstock 20, its end being necked and held in a bearing therein, lost motion being taken up by an adjusting screw 21. This tailstock slides in suitable ways and can be manually moved to and fro by a screw 22 actuated by the hand wheel 23. Mounted upon this screw so as to revolve therewith is a ratchet wheel 24 actuated by a pawl 25 mounted on a link 26 which is connected to a universal bar 27 moved in one direction by a spring 28 and in the other direction by an oscillating catch lever 29 actuating a pawl 30 carried by the bar 27. This lever 29 is actuated by an eccentric link 31 driven by an eccentric on the shaft 16 (Fig. 6.).

As the shaft 16 is rotated the lever 29 is oscillated and moves the pawl 30 together with the universal bar 27 whenever the pawl is permitted to engage the lever 29. This engagement, as will be hereinafter described, is controlled by the jacquard head through a multiplier. The purpose of the mechanism just described is to shift the shell arbors longitudinally at the end of every complete revolution for the purpose of having the engraving tools hereinafter described, engage the surface to be engraved at a point displaced slightly from their engagement during the first revolution.

Figures 8, 8B:
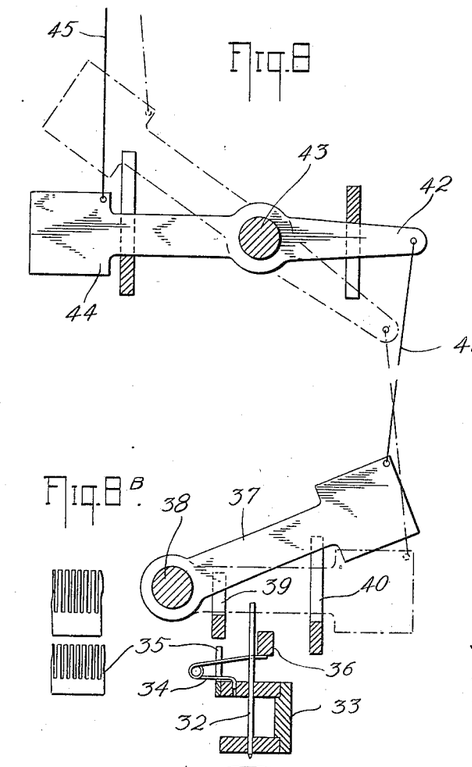
Fig. 8 is an enlarged diagrammatic view of the surface to be engraved with the engraving needle and the devices controlled by the jacquard head for controlling said needle.
Figure 8A:
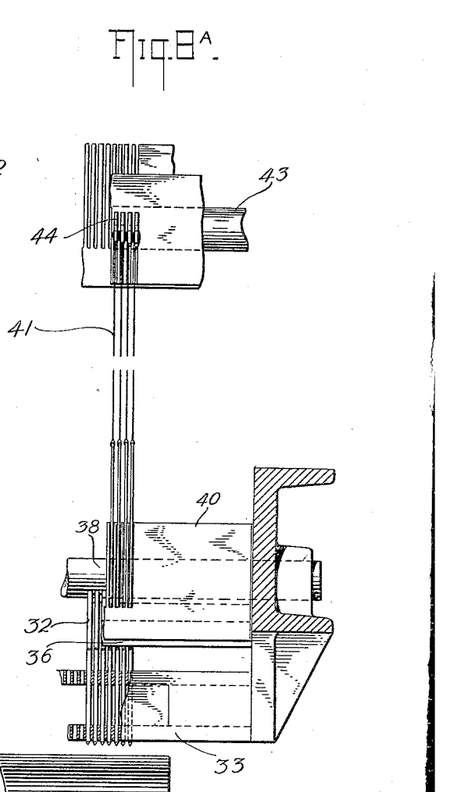

The engraving tools are needles 32 shown in enlarged form in Figs. 8 and 8A. There are for each shell a series of needles each series being mounted in a suitable guide 33 and the individual needles are normally held in lifted position by light hair-pin springs 34, the lower ends of which are suitably engaged while the upper ends are guided by a comb 35. These hair-pin springs pass through holes in the engraving needles and lift them by an upward movement limited by the stop 36. Above each needle there is a weight 37 pivoted upon the bar 38 and guided by combs 39 and 40. Attached to each of these weights is a string 41 which in turn is attached to the end of a lever 42 pivoted on a bar 43 and having a weight 44 at its rear end which is attached to a string 45 extending upwards through a guide 46 (Fig. 1) to one of the hooks 47 of the jacquard head. These hooks engage in the usual manner with vertically reciprocating cross bars 48 of the griffe when permitted to do so by their jacquard needles 49, there being, as is understood by those skilled in the jacquard art, one jacquard needle for each hook, the jacquard needle having an eye through which the body of the hook passes, so that while the jacquard needle may control the fore and aft position of the hook, the hook will be free to rise and fall. The jacquard needles, as in ordinary jacquard heads, are guided by needle boards 50 which are fixed relatively to one another, although in my present invention they are adjustable vertically as and for purposes hereinafter described.

In front of the front needle board is a square jacquard card carrier 51 over which an ordinary jacquard chain of cards 52 passes. This card carrier is supported at both ends by slides 53 which are moved backwards and forwards by links 54 connected to cross head 55 which is provided with a lever arm 56 which is actuated through the link 57 by an adjustable crank pin 58 on the fly wheel 59 of the shaft 16. The lever 56 is also connected to a link 60 which is connected to a vertical sliding rod 61 carrying the griffe 62 with the cross bars 48. The revolution of the shaft 16 therefore results in the rising and lowering of the bars 48 and also results in the moving of the carrier 51 towards and from the front needle board 50. The cards upon the carrier 51 engage the jacquard needles 49 to move them out of the path of the rising cross bars 48 or permit them to be undisturbed so as to be lifted by the cross bars according to whether the point opposite any needle is blank or perforated and thus determine whether the cross bars 48 shall lift the hooks. As is well known, the carrier 51 is revolved through 90° between each reciprocation so as to present a new card to the jacquard needles, this being brought about in the ordinary manner by means not shown.

Figure 1:
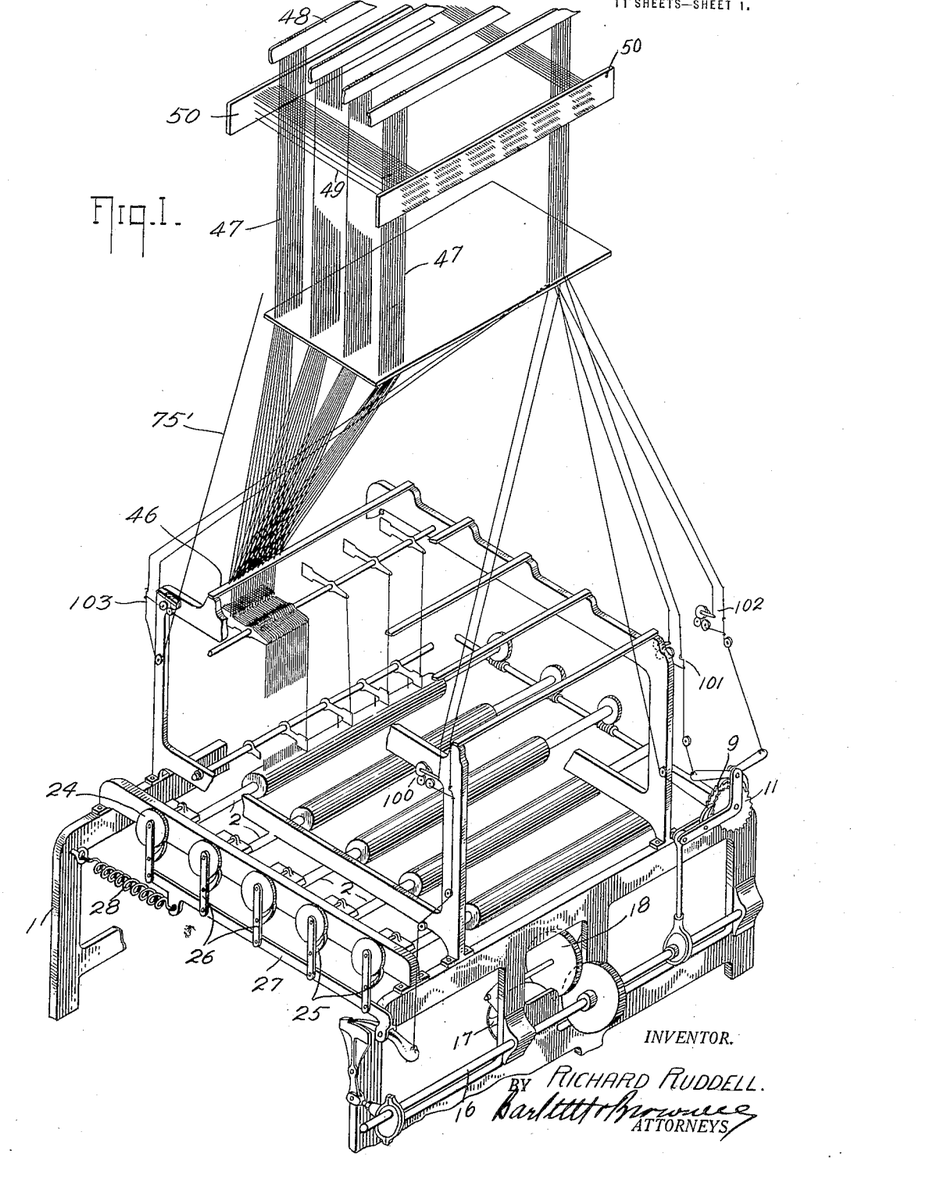
Fig. 1 is a diagrammatic view showing in perspective the elements of a machine embodying my invention.
Figure 2:
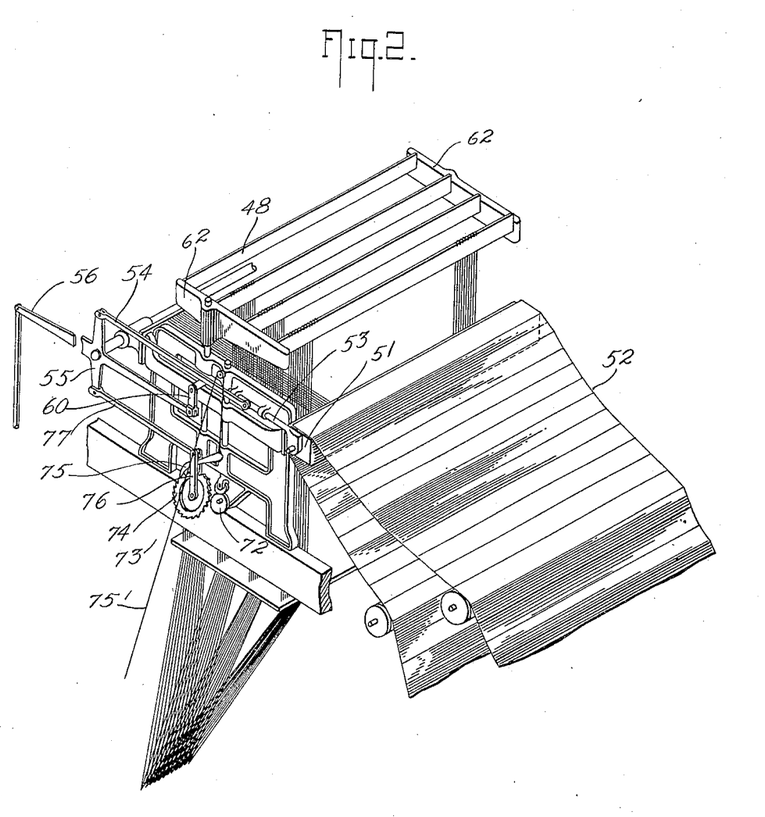
Fig. 2 shows more in detail the jacquard head and chain shown diagrammatically in the upper part of Fig. 1.
Figure 9:
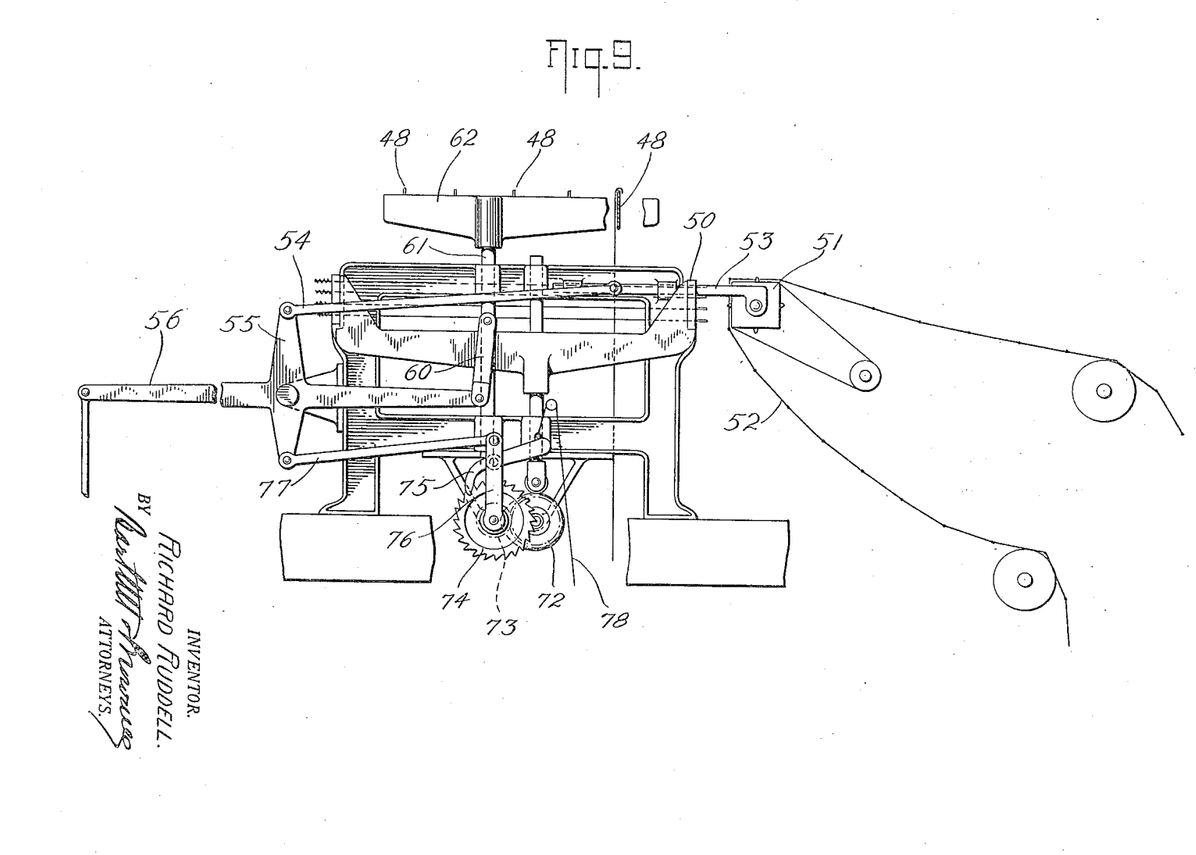
Fig. 9 is a detail end view of the jacquard head and means for shifting the needle boards.
Figure 11:
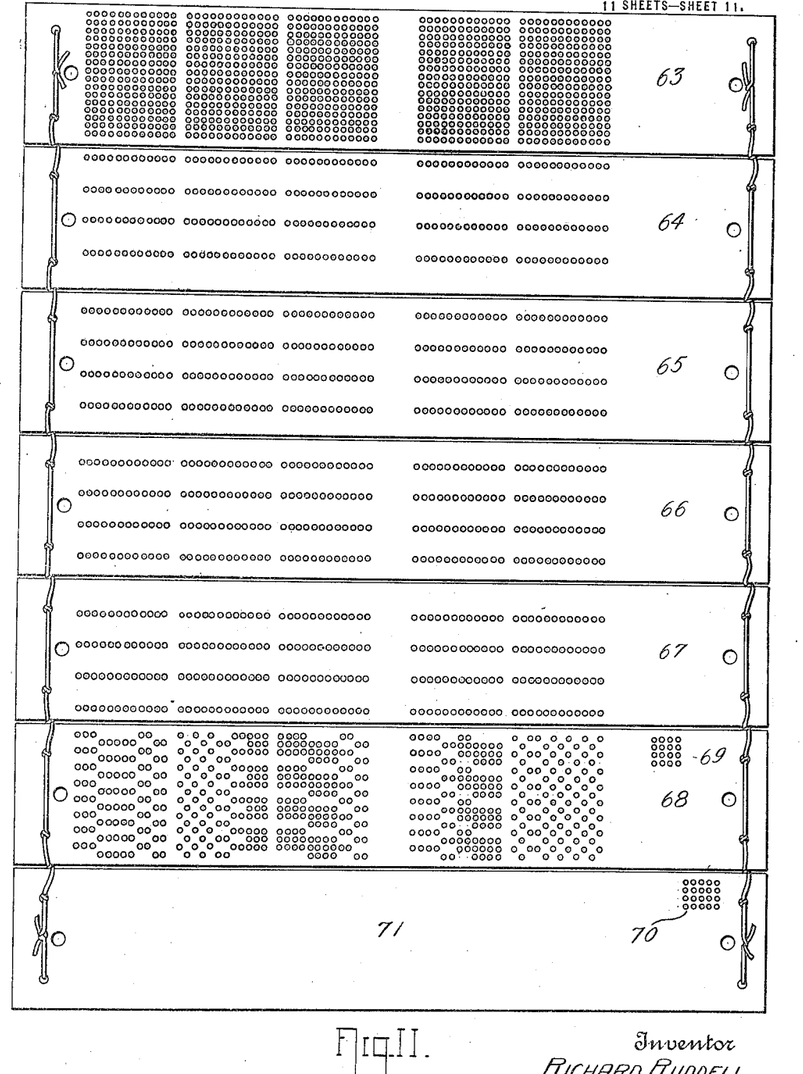
Fig. 11 is an illustrative view of a chain of jacquard cards to which reference will be made in explaining the invention.

Fig. 11 shows a number of typical jacquard cards having numerous perforations producing various effects in connection with my engraving machine. Card 63 shows punchings for controlling jacquard needles which in turn control engraving tools for five shells, there being five groups each containing 12 vertical rows of perforations and 16 horizontal rows of perforations. This is to show the full number of holes or spaces in such a card. As shown in Figs. 1 and 9 the jacquard needles in my present embodiment are so disposed that there are needles in front of the first, fifth, ninth and thirteenth horizontal rows of a card and in front of those rows only when the needle boards are in their lowest positions. In card 64 the perforations shown correspond to all the spaces in the fourth, eighth, twelfth and sixteenth rows; in card 65 they correspond to the spaces in the third, seventh, eleventh and fifteenth rows, and in card 66 they correspond to the spaces in the second, sixth, tenth and fourteenth rows, in card 67 they correspond to the spaces in the first, fifth, ninth and thirteenth rows.

For this reason the cards such as 64 would permit hooks of the jacquard head to act only when the card was in its lowermost position while cards such as 65 would permit them to act only when the cards were in the next higher position, and cards 66, 67 would correspondingly permit needles to act only in one of the next two positions. Cards 64 to 67 are illustrative and would seldom be used. Card 68 however, is a typical card and shows perforations such that some of the needles would be permitted to act with the needle boards in any position. By making use of four rows of needles in the jacquard head and by shifting the cards vertically from time to time a very great variety of combinations can be secured with a comparatively small number of cards, and this feature is one of the important features of my invention since it reduces the storage space necessary for cards to such an extent as to make the idea feasible.

In addition to the five groups of holes upon the cards shown in Fig. 11, there is a small group 69 on card 68 and a group 70 on card 71. These are what are known as mechanism holes and are for the purposes of controlling various features of the machine in a manner practised and well understood by those familiar with Jacquard looms. Thus for instance, if it is desired to operate certain mechanism at the end of a given period, a certain number of the pattern cards passing will be provided with mechanism holes which will set the mechanism for operation and control it so that at the end of that period it will on account of holes 70 in a mechanism card 71 perform the desired operation as will be hereinafter more fully described. Card 71 it is to be noted, is a mechanism card pure and simple, while card 68 is a combined pattern and mechanism card.

In order to move the needle boards 50 upwardly and downwardly I provide a cam 72 (Fig. 9) driven by a gear 73 which in turn is driven by a ratchet 74 actuated by a pawl 75 mounted in the frame 76 connected by a link 77 to the lever 56. This pawl has connected to it a cord 78 which as hereinafter described, is controlled by a multiplier. This multiplier when set by mechanism holes in pattern cards permits the pawl 75 to engage the gear 74 and when thereafter actuated under the control of mechanism cards and moves the same a certain distance determined by the mechanism cards until the cam 72 shifts the needle boards 50 either upward or downward a distance equal to the distance between any two of its adjacent positions, thereby bringing the needles opposite any desired spaces corresponding to the 16 horizontal rows of card 68 (Fig. 11).

Figure 10:
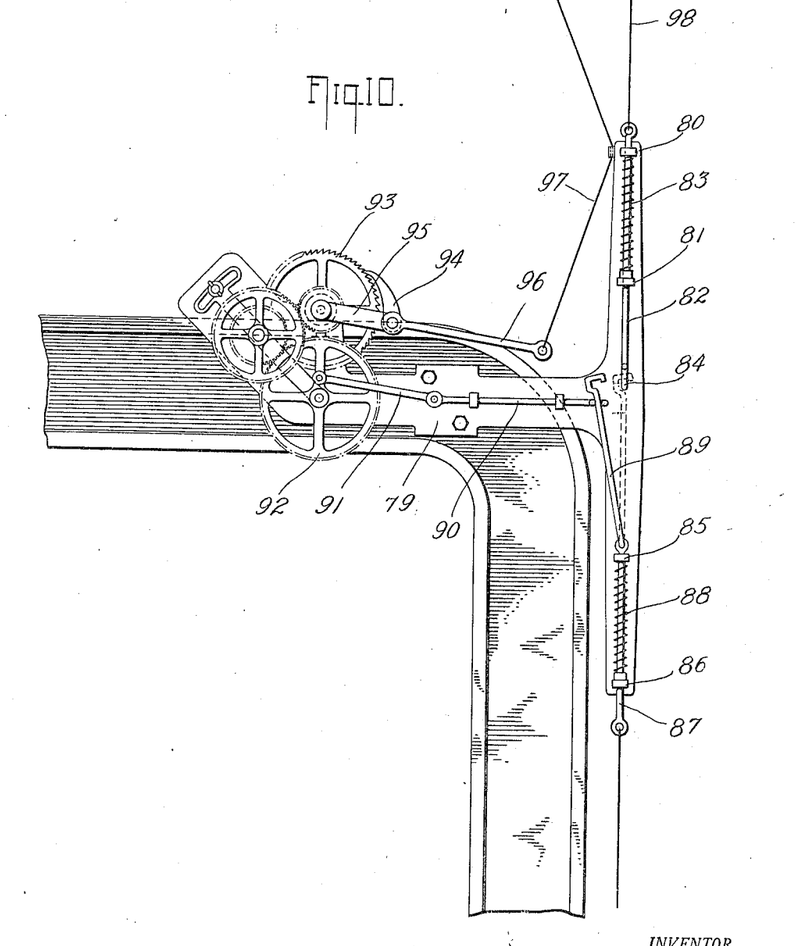
Fig. 10 is a detail of one of the multipliers of which several are used in the machine.

One of the multipliers is shown in detail in Fig. 10, the same consisting of a supporting plate 79 mounted on any convenient portion of the machine frame. This supporting plate is provided with two guides 80, 81 in which moves a rod 82 normally held in depressed position by the spring 83. This rod at its lower end is provided with a loop 84. The supporting plate is also provided with two guides 85, 86 in which slides a rod 87 normally held in depressed position by a spring 88. To the upper end of this rod is connected a hook 89 which from time to time enters the loop 84, as shown in dotted lines. This hook 89 is controlled by a slide 90 actuated by a connecting bar 91 from a crank pin upon a gear 92 which through intermittent gearing is driven by a ratchet wheel 93 actuated by a pawl 94 carried by a pivot frame 95. This frame has a lever arm 96 to which is connected a cord 97 which in turn is connected to a jacquard hook whose needle is controlled by the presence or absence of corresponding mechanism holes in pattern cards of the chain. The slide 82 is also connected by a cord 98 to a similar hook in the jacquard head which is controlled by mechanism cards. From this it will be seen that whenever a card permits the needle corresponding to either cords 97 or 98 to engage the reciprocating cross bars 48, one or both of those cords will be drawn upward. In actuating these multipliers the cards are so perforated that after a certain number of turns the cords 97 will be pulled enough times to cause the hook 89 to engage the loop 84, and thereafter the needle corresponding to the cord 98 will permit its hook to engage the cross bar 48 a sufficient number of times to cause the cord extending downwardly from the bar 87 to operate to produce the desired result.

Referring to Fig. 1 it will be seen that there are four such multipliers used in the machine. Thus the multiplier 100 which controls the pawl 30 for controlling the longitudinal shifting of the arbors 2, the multipliers 101, 102 which control the pawls 8', 10 respectively to shift the arbors one-half the space from the zero position and return it to such position. The multiplier 103 which through the connection 75' controls the pawl 75 for determining when the needle boards 50 shall be raised and lowered.

Operation: In operating an engraving machine embodying my invention, a series of cards is first punched and connected up into chains according to the principles of jacquard weaving, so as to control the hooks of the jacquard head properly for the engraving of the desired design or designs and mounted upon the card carrier 51, proper shells previously varnished being mounted upon arbors 2 and the machine being set so that the arbors are brought back to the original zero position circumferentially and to initial position longitudinally. This latter being accomplished by the hand wheel 23. The machine is then put in operation whereupon the hooks in the jacquard head are lifted or remain at rest according to the punchings in the cards. When any engraving hook is lifted, the corresponding lever 37 is allowed to fall so as to engage the corresponding needle and depress it into engagement with the roll 3. When the hook in the jacquard head lowers the lever 37 will be raised so that the engraving needle will be retracted by its spring 34.

In order to produce repeats of the pattern, each hook is connected to weights 37 controlling a plurality of engraving needles as shown diagrammatically in Fig. 1 in the same manner as each hook is connected to a plurality of needles in the Jacquard loom for producing repeats. In the present instance, each hook is connected with five levers 42 and thus controls five levers 37 which in turn control five corresponding engraving needles in as many groups.

In order to add to the ease of understanding the principles of my invention, I shall at this point set forth an example for engraving, as follows, which I shall often refer to: Suppose that an 8-inch by 8-inch pattern is to be engraved for five colors on five copper shells, one color per shell, shells 16 inches in circumference by 40 inches long. There will therefore be two repeats of the patterns in the circumference of the shell and five repeats in the length of the shell. Also for this example, I assume a fineness of engraving of 72 marks per inch both circumferentially and longitudinally. Also I assume that the machine is equipped with engraving needles spaced 1/6th of an inch, that is 6 engraving needles per inch, making 48 engraving needles per each 8 inch or repeat of the pattern, which means 48 times 5 or 240 engraving needles per shell.

One ordinary Jacquard loom card has two equal sections each having spaces for 16 horizontal rows of holes and 40 vertical holes with 4 additional rows of 4 mechanism holes each in each corner of the card, making a possible total of 1,280 pattern holes or hole spaces and 16 mechanism holes or hole spaces for each card.

In the present example I allot to each of the copper shells a section of hole spaces for 12 holes long by 16 holes high which equals 192 hole spaces per section or as shown in card 63, 960 for the entire pattern and for all five shells.

The first engraving needle of each repeat mounted longitudinally on the shell is tied to and controlled by the first jacquard hook in the corresponding card section, the first jacquard hook by the first jacquard needle, similar connections existing between successive engraving needles, hooks and jacquard needles up to and including the 48 engraving needles, hooks and jacquard needles. The 48 jacquard needles controlling the 48 engraving needles are placed when engraving commences, in the jacquard head opposite to card rows 1, 5, 9 and 13 counting upward from the bottom of the jacquard card; that is opposite twelve hole spaces in each of those four rows making a total of 48 hole spaces corresponding to 48 jacquard needles. All this is true of each of the five sections of the jacquard cards corresponding to each of the five colors and copper shells.

Each first jacquard hook is connected to each of the five needles corresponding to similar positions in each of the five repeats so that all of these needles are raised and lowered simultaneously and the succeeding jacquard hooks are each connected to the succeeding needles in each of the five repeats, the 48th jacquard hook being connected to each 48th engraving needle in each of the 5 repeats.

After the machine has been set up the chain of cards is fed twice through the jacquard head, the cylinders being meantime completely revolved, the movements taking place when the engraving needles are in engagement therewith so as to produce scratches, in the present instance, 1/72d of an inch in length. This makes two circumferential repeats. After the cylinders have been revolved they are under the control of mechanism cards moved longitudinally 1/72d part of an inch by the action of ratchet 25 upon the ratchet wheel 24, the engraving needles being elevated and while the engraving needles are still elevated the cylinders are revolved 1/144th part of an inch by the action of the pawl 8' upon the ratchet wheel 9. The chain of cards is then fed through the machine a third and a fourth time thereupon the cylinder is moved longitudinally another 72d part of an inch by the screw 22, and is rotated reversely 1/144th part of an inch by the pawl 10, whereupon the chain of cards is fed through a fifth and sixth time thus producing three similar lines of scratches separated from each other by 1/72d part of an inch, adjacent lines being displaced circumferentially 1/144th part of an inch so as to make the scratches in the three lines overlap or break joints with one another, the control of the pawls being attained by mechanism holes in the chain of cards.

At this time the cam 72 controlled through the multiplier 103 is actuated to shift the needle boards 50 upward one space so as to bring the ends of the jacquard needles in line with the 2nd, 6th, 10th and 14th rows of hole spaces in the jacquard cards and the chain of cards is fed through six times more, the rolls being shifted longitudinally after each second time and also adjusted as to their zero position between each second time. This operation is repeated until the chain of cards has been fed through the jacquard head 24 times, six times with the jacquard needles in line with each of the rows 1, 5, 9 and 13, the rows 2, 6, 10, and 14, the rows 3, 7, 11, and 15 and the rows 4, 8, 12, and 16 respectively.

The cards are fed through six times for each settling of the needle boards 50 so as to get a sufficiently broad cutting in the varnish on the cylinder. The varnish between the three lines thus formed is so slight that when the roll is consequently immersed in acid, it is undercut so as to be removed and produce but a single etched line for receiving color.

At each setting of the needle boards 50, the shells are not only returned to zero position but are moved longitudinally 1/72d of an inch so that the resulting lines on succeeding revolutions of the rolls are properly spaced.

The cards during each revolution of the roll are fed through the head two times to make two circumferentially spaced repeats from the roll.

The machine can be so adjusted that the circumferential movements of the rolls as well as the transverse movements of the rolls will all take place when the engraving needles are out of contact therewith. When this is the case the needles will form pin pricks in the varnish as distinguished from scratches in the varnish and the design can be worked onto the rolls in either manner as preferred. In both cases, however, it is desirable to stagger the markings which is done by shifting the circumferential zero position after each circle of marks in the manner above described.

When operated as described there will be two circumferential repeats upon the rolls and five longitudinal repeats thereof, all of which are determined by the punchings in the cards fed through the jacquard head, the movements of the rolls being controlled by mechanism holes in cards of the chain.

The needles are pointed needles and the marks which they make correspond to the sharpness of their points and may be from 1/20 to 1/100th of an inch in width and even finer.

The motion necessary to accomplish the cycle of any multiplier is obtained by mechanism holes in the pattern cards which are familiar to those skilled in Jacquard looms. For instance if it is desired to have a multiplier complete its cycle in two passings of the card pack and it takes 96 motions of its pawl to complete the multiplier's cycle, there would be 48 mechanism holes for the needle to control that multiplier in as many pattern cards. The first few cards in the pack are the best to use. After the cycle is completed holes in mechanism cards actuate the multiplier to produce the desired result, the engraving needles being at rest.

As stated before my machine requires at least four multipliers. The traverse multiplier 100 allows the longitudinal traverse of the shells after completion of each circle of engraving.

The jacquard needle board shift multiplier 103 causes the operation of a system of cams, ratchets and pawls that shift the jacquard boards and needles from one position to another, the shift being controlled by several mechanism cards, such as card 71 which are devoted exclusively to this function of the machine, with the result that when the shift is taking place, none of the other functions of the machine can occur. Other multipliers however, can be actuated by mechanism holes in cards which also contain pattern holes such as card 68.

The zero shift multiplier 101 controls the fraction pawl which operates on ratchet 8' and permits this pawl to come into action for shifting the zero at the proper time.

The zero shift reverse multiplier 102 acts to engage the pawl 10 of the shell revolving mechanism at the proper time in the cycle of the machine to restore the shells by cylindrical motion to the original zero position.

The regular revolving pawl 8 is controlled by a jacquard needle and hook and is lifted out of engagement with its ratchet, by mechanism cards so as to free the ratchet wheel 9 when its shaft is being actuated by either of the pawls 8' or 10. The pawl 8 is lifted out of engagement whenever any other functions are being performed which do not require the normal intermittent rotation of the shells; i. e. whenever engraving is not desired.

The functioning of the machine after all the adjustments and settings have been made are as follows: During the first passage of the cards through the jacquard head, one half of a circle of marks is formed upon each shell but none of the functions controlled by the mechanism holes are allowed to occur. In passing the pack through once the various multipliers have been moved through parts of their respective cycle by their respective jacquard hooks which are in turn controlled by jacquard needles and mechanism holes in the pattern cards. When the cards have passed through a second time the first circle of engraving by each engraving needle on each of the five shells has been completed. Each needle if the pattern calls for it would have made a possible 1152 marks. This equals a total of 276,480 marks per shell.

After completing this entire circle the following functions occur:

The shells are moved longitudinally 1/12th of 1/6th or 1/72d of an inch. The zero shift occurs amounting approximately to 1/2 of 1/72d of an inch (1/144d) circumferentially. No other functions of the machine are allowed to occur. The pack of cards is passed through a 3rd and 4th time completing the second circle of engraving, and the following functions occur:

The traverse of 1/72d of an inch, the shells revolved backwards (or zero reverse) 1/2 of 1/72d (1/144) of an inch. None of the other functions of the machine are allowed to occur.

The pack of cards is passed through the machine a fifth and sixth time completing the third circle of engraving, after which the following functions of the machine occur:

The traverse of 1/72 of an inch, zero shift of 1/144 of an inch. The jacquard needle board shift into second position, the jacquard needles being thus moved opposite hole spaces 2, 6, 10 and 14 of the jacquard card. None of the other functions of the machine are allowed to occur. It will be observed that the engraving done in the first, second and third circles is exactly the same as the first circle except that the second circle is moved forward circumferentially 1/2 the length of the engraved mark with the result that the marks are staggered.

The pack of cards is then passed through the machine a seventh and eighth time completing the fourth circle, the engraving done in this circle being controlled by an entirely new set of holes in the jacquard cards. After the completion of the fourth circle the following functions occur:

The traverse of 1/72 of an inch and zero shift reverse. None of the other functions of the machine are allowed to occur.

The pack of cards is then passed through two more times completing the fifth circle, after which the following functions occur:

Traverse of 1/72 of an inch and zero shift. None of the other functions of the machine are allowed to occur.

The pack of cards is then passed through two more times completing the sixth circle, after which the following functions occur:

Traverse, zero shift reverse and jacquard needle board shift to the third position placing jacquard needles opposite to positions corresponding to hole spaces 3, 7, 11 and 15. None of the other functions of the machine are allowed to occur.

The pack of cards is then passed through six more times and the seventh, eighth and ninth circles are engraved functionally the same as were the first, second and third circles, after which the same functions of the machine occur as after the sixth circle with the result that the jacquard needles are opposite positions 4, 8, 12, and 16.

Thereupon follows the engraving of the tenth, eleventh and twelfth circles corresponding functionally to the 4th, 5th and 6th circles at the end of which time all of the engraving on all five shells is completed.

If the cards call for it, each shell may receive a possible 3,317,760 markings, the mechanical performance of which would have been accomplished by my invention in a much shorter time, with much less labor and much greater accuracy than if done by hand.

As will be evident to those skilled in the art, my invention permits of various modifications without departing from the spirit thereof or the scope of the appended claims.

What I claim is:

1. In an engraving machine, the combination of a series of engraving needles, a jacquard head, means controlled by said jacquard head for positioning said needles, to engrave a pattern, and means for moving a surface to be engraved by said needles.

2. In an engraving machine, the combination of a series of engraving needles, a jacquard head, means controlled by said jacquard head for positioning said needles to engrave a pattern, means for moving a surface to be engraved by said needles, and means controlled by said jacquard head for shifting said surface longitudinally of the pattern when said needles are in engagement therewith.

3. In an engraving machine, the combination of a series of engraving needles, a jacquard head, means controlled by said jacquard head for positioning said needles to engrave a pattern, means for moving a surface to be engraved by said needles, and means for shifting said surface transversely of the pattern between the forming of each line of engraving marks.

4. In an engraving machine, the combination of a series of engraving needles, a jacquard head, means controlled by said jacquard head for positioning said needles to engrave a pattern, means for moving a surface to be engraved by said needles longitudinally of the pattern, said jacquard head having its jacquard needle boards movably transversely to the longitudinal axis of the jacquard cards opposed thereto, and means controlled by said cards for periodically shifting said needle boards.

5. In an engraving machine, the combination of a series of engraving needles, a jacquard head, means controlled by said jacquard head for positioning said needles for engraving a pattern, means for moving a surface to be engraved by said needles longitudinally of the pattern, yielding means for normally retracting said needles from said surface, and means controlled by said jacquard head for forcing said needles into engagement with said surface.

6. In an engraving machine, the combination of a series of engraving needles, a jacquard head, means controlled by said jacquard head for positioning said needles to engage a pattern, a revolvable arbor adapted to support a cylindrical surface to be engraved, and means controlled by said jacquard head for intermittently revolving said arbor.

7. In an engraving machine, the combination of a series of engraving needles, a jacquard head, means controlled by said jacquard head for positioning said needles to engrave a pattern, a revolvable arbor adapted to support a cylindrical surface to be engraved, means controlled by said jacquard head for intermittently revolving said arbor, and means for shifting said arbor longitudinally of its axis at the end of each revolution.

8. In an engraving machine, the combination of a series of engraving needles, a jacquard head, means controlled by said jacquard head for positioning said needles to engrave a pattern, a revolvable arbor adapted to support a cylindrical surface to be engraved, means controlled by said jacquard head for intermittently revolving said arbor, means for shifting said arbor longitudinally of its axis at the end of each revolution, and means for revolving said arbor a fraction of a normal step between the engraving of two successive lines of markings thereon, said means being controlled by said jacquard head.

9. In an engraving machine, the combination of a series of engraving needles, a jacquard head, means controlled by said jacquard head for positioning said needles to engrave a pattern, a revolvable arbor adapted to support a cylindrical surface to be engraved, means controlled by said jacquard head for intermittently revolving said arbor, means for automatically shifting said arbor longitudinally of its axis at the end of each revolution, and manually operated means for adjusting said arbor longitudinally.

10. In an engraving machine, a plurality of arbors adapted to have surfaces to be engraved mounted thereon, the axes of said arbors being parallel, means for simultaneously rotating said arbors step by step, a series of engraving needles for each arbor, the same being free to move longitudinally in a fixed plane, and a jacquard head controlling the longitudinal movements of the needles in all of said series.

11. In an engraving machine, the plurality of arbors adapted to have surfaces to be engraved mounted thereon, the axes of said arbors being parallel, means for simultaneously rotating said arbors step by step, a series of engraving needles for each arbor, the same being free to move longitudinally in a fixed plane, and a jacquard head controlling the longitudinal movements of the needles in all of said series, said series being divided into corresponding groups and corresponding needles in the several groups being controlled by the same hook in the jacquard head.

12. In an engraving machine, a plurality of arbors adapted to have surfaces to be engraved mounted thereon, the axes of said arbors being parallel, means for simultaneously rotating said arbors step by step, a series of engraving needles for each arbor, the same being free to move longitudinally in a fixed plane, and a jacquard head controlling the longitudinal movements of the needles in all of said series, said series being divided into corresponding groups and corresponding needles in the several groups being controlled by the same hook in the jacquard head, and means for varying the zero position of all of said arbors simultaneously between successive revolutions thereof.

RICHARD RUDDELL.